Oct. 19, 1965   E. B. BURNETT ETAL   3,212,294
CAM TYPE IMPULSE TOOL
Original Filed Dec. 12, 1962   5 Sheets-Sheet 1

INVENTORS
ELMER B. BURNETT
JACK S. VAUGHN

BY
ATTORNEY

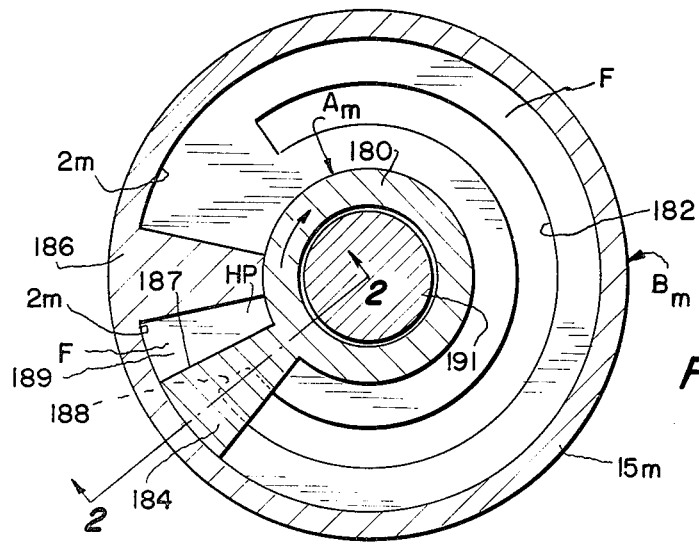
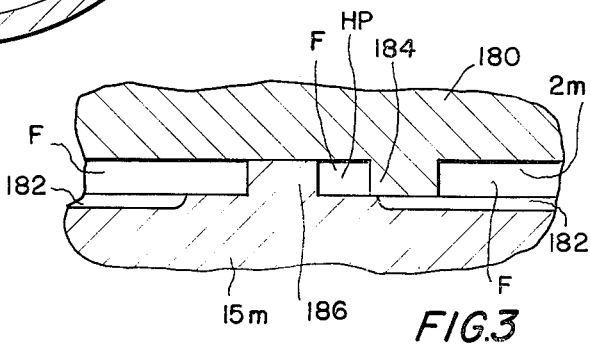
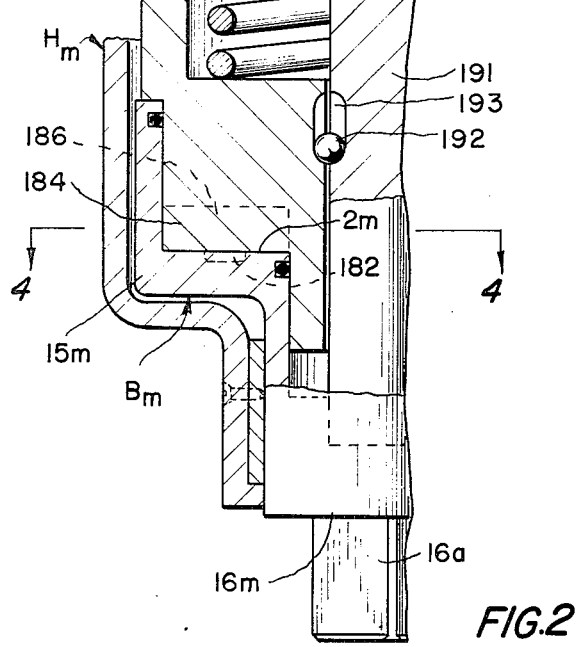

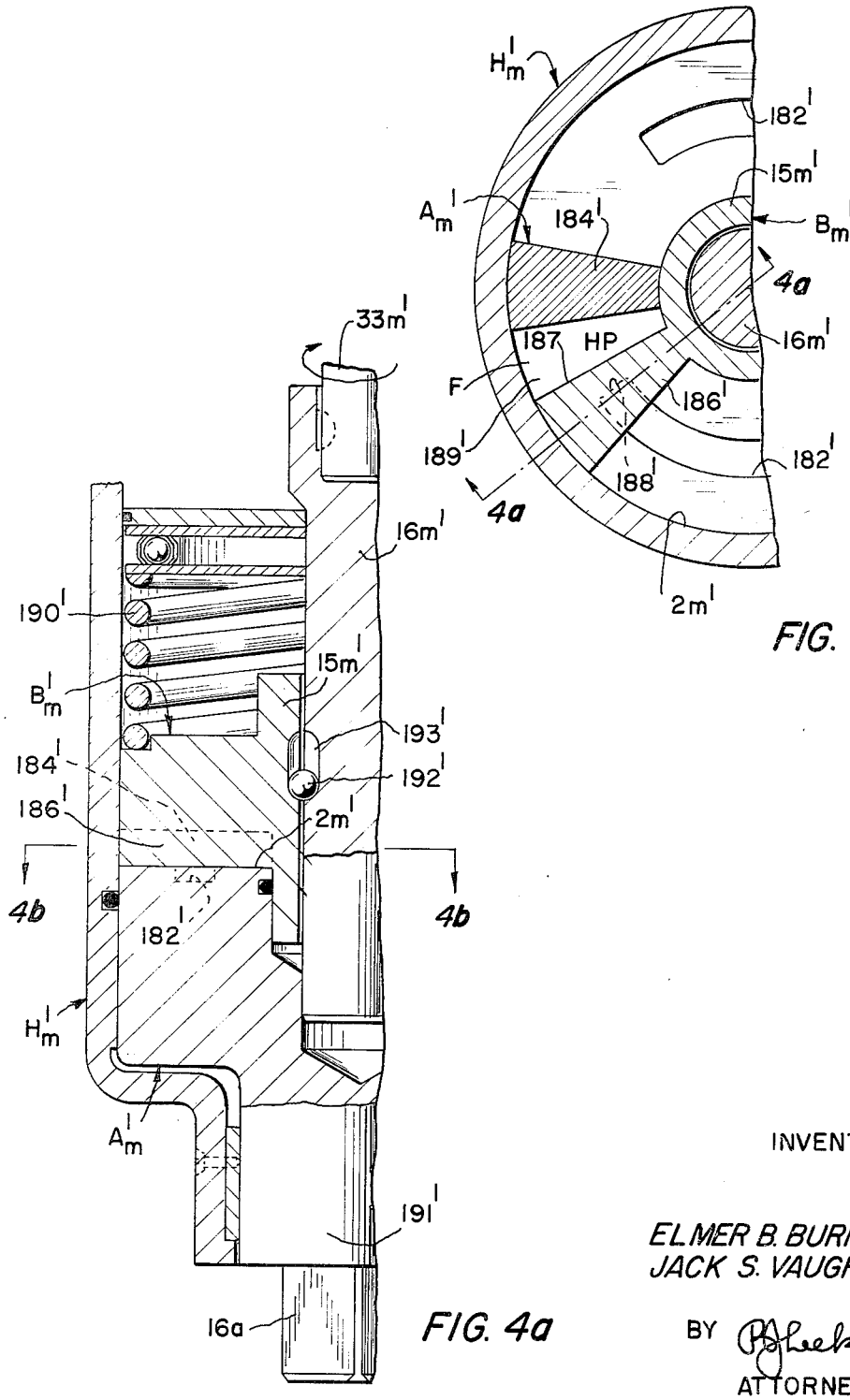
FIG. 4b
FIG. 4a
INVENTORS
ELMER B. BURNETT
JACK S. VAUGHN
BY 
ATTORNEY

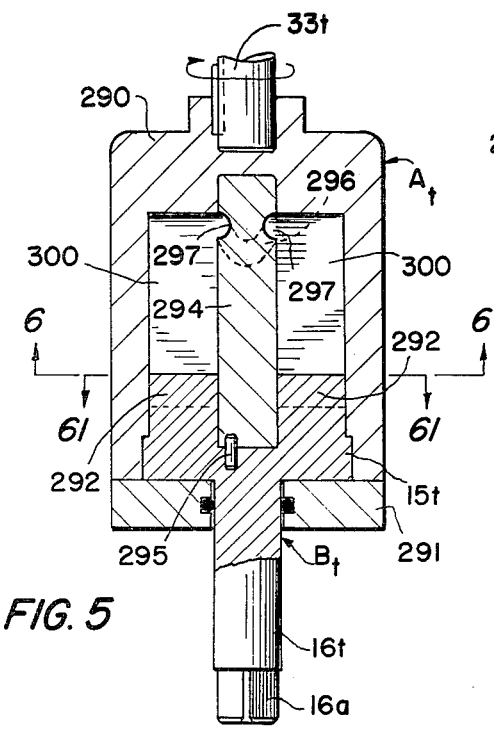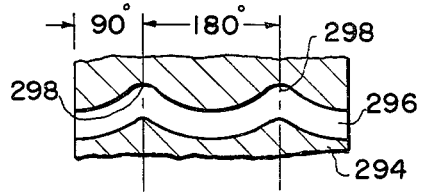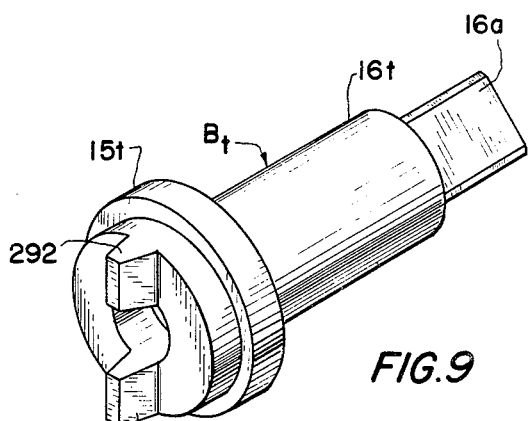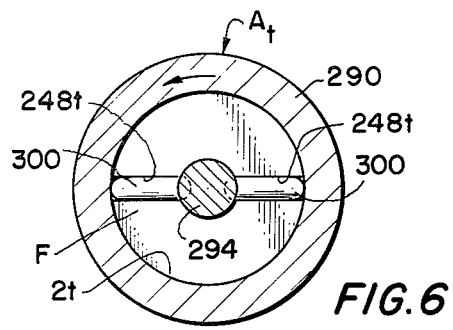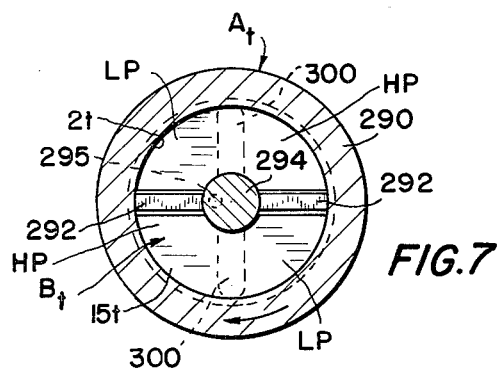

INVENTORS
ELMER B. BURNETT
JACK S. VAUGHN

3,212,294
CAM TYPE IMPULSE TOOL
Elmer B. Burnett, Monroeton, and Jack S. Vaughn, Sayre, Pa., assignors to Ingersoll-Rand Company, New York, N.Y., a corporation of New Jersey
Original application Dec. 12, 1962, Ser. No. 244,151. Divided and this application May 5, 1964, Ser. No. 377,794
14 Claims. (Cl. 64—26)

This application is a divisional application of U.S. patent application Serial #244,151 filed December 12, 1962 by Donald K. Skoog, et al. and entitled "Impulse Tool."

The present invention relates to impulse tools of the type disclosed in U.S. Patent No. 3,116,617 issued January 7, 1964 to D. K. Skoog for Fluid Impulse Torque Tool and more particularly to an improved impulse tool of the cam type.

Heretofore, conventional portable, power operated tools for driving nuts, bolts and screws or for applying a torque to other objects have been of the stall, clutch and impact type. While the stall type and clutch type tools give satisfactory torque control in most applications, these types are larged and hence heavier than the impact tool. Further the stall type and clutch type tools are slower in operation than the impact type tool. In addition the stall type and clutch type tools provide an undesirable torque reaction to the operator, which torque reaction is not present in a tool of the impact type.

In the impact type of tool the kinetic energy of the rotary hammer (of large mass) is transferred to the spindle (of relatively lower mass) by a collision between the jaws of the hammer and the spindle. These conventional impact tools have several limitations. First the rigid jaws of the hammer and the similar jaws of the spindle are relatively light in order to satisfy the demand of the fabricating industries for a light portable tool. However the forces between the jaws of the hammer and the jaws of the spindle are very high during the time of impact therebetween, with resultant breakage or failure of such jaws and a shorter service life than in other conventional power tools, such as those of the stall or clutch types. Secondly, with these conventional impact tools it is very difficult to control or limit the final torque on a threaded fastener to a final predetermined value within satisfactory limits of accuracy. Further the impact tools are difficult to manufacture because of their complicated structure and are rather noisy in their operation.

It is the general object of the present invention to avoid and overcome the foregoing and other difficulties of and objections to prior art practices by the provision of an improved tool of the impulse type which tool has all of the advantages of the stall type, clutch type and impact type tools and none of the disadvantages thereof.

A further object of the present invention is the provision of an impulse type tool which operates in a fluid at low force levels with resultant minimum wear and attendant longer service life than conventional impact tools.

Another object of the present invention is the provision of an impulse tool which is operable to control the final torque on a threaded fastener accurately and precisely within predetermined limits.

Still another object of the present invention is the provision of an impulse tool which, because of the simplicity of its structure, is easy to manufacture.

Yet another object of the present invention is the provision of an impulse tool which provides relatively quiet operation as compared to an impact tool.

A further object of the present invention is the provision of an improved tool of the impulse type, the major elements of which tool act to seal dynamically or at high velocity and function as a valve statically or at low velocity.

A still further object of the present invention is the provision of an impulse tool which is lighter in weight and faster in operation than the tools of the stall type and clutch type.

A further object of the present invention is the provision of an impulse tool which is operable to apply a torque or a series of impulses at an angle with respect to the longitudinal axis of the impulse tool.

Another object of the present invention is to provide a cam type impulse tool capable of producing multiple impulses during each revolution of the driven element of such impulse tool.

For a better understanding of the present invention reference should be had to the accompanying drawings, wherein like numerals of reference indicate similar parts throughout the several views and wherein:

FIG. 2 is a half vertical sectional view of the Pott type impulse tool showing the housing means as the driven member along the line 2—2 of FIG. 4 in the direction of the arrows;

FIG. 3 is a developed view of the jaws;

FIG. 4 is a vertical sectional view along the line 4—4 of FIG. 2 in the direction of the arrows;

FIG. 4a is a half vertical sectional view similar to FIG. 2 showing the spindle means connected to the drive means as the driven member, by means of the ball cam and having the spring disposed thereabout; the housing means being the member which receives the impulse along the line 4a—4a of FIG. 4b in the direction of the arrows;

FIG. 4b is a fragmentary horizontal sectional view along the line 4b—4b of FIG. 4a in the direction of the arrows;

FIG. 5 is a longitudinal sectional view of the cam type impulse tool of the present invention showing the housing means as the driven member;

FIG. 6 is a vertical sectional view along the line 6—6 of FIG. 5 in the direction of the arrows;

FIG. 7 is a view similar to a vertical sectional view along the line 7—7 of FIG. 5 in the direction of the arrows but with the spindle blades rotated 90° from the position shown in FIG. 5;

FIG. 8 is a development view of the cam;

FIG. 9 is a perspective of the spindle assembly;

The aforesaid objects of the present invention and other objects which will become apparent as the description proceeds are achieved by providing an impulse tool for applying a predetermined torque to an object. This impulse tool comprises housing means provided with a cavity adapted to contain a fluid, a spindle means rotatable in the housing means and in the fluid and adapted to engage the object, and drive means connected to one of the housing means and spindle means for rotating the one with respect to the object. First jaw means are on one of the housing means and the spindle means and in the cavity. Second jaw means are on the other of the housing means and the spindle means and in the cavity. The first jaw means and the other and the second jaw means and the one are disposed in sealing relation during a relatively small portion of each revolution of the relative rotary movement. The first jaw means and the other and the second jaw means and the one are operable during the relatively small portion of each revolution of the relative rotary movement to dynamically seal off a portion of the cavity so that the pressure in the high pressure portion of the fluid and on the other increases thereby causing the other of the housing means and the spindle means to rotate with respect to the one and to apply a torque to the object. Alternatively, blade means are in the recess. Jaw means are on the other of the housing means, and the spindle means. Cam means are on the other engageable with the blade means for inserting the blade means into the fluid.

The cam type impulse tool of the present invention has blade means carried by the driven element (either housing means or spindle means). The blade means are engageable with cam means carried by the other element or normally stationary element and impulse jaw means also carried by the other element.

While the impulse tool of the present invention may be advantageously employed for applying a torque to objects and as a source of fluid impulses in general, the impulse tool of the present invention is particularly adapted for use in conjunction with applying a torque to a threaded fastener and hence it has been so illustrated and will be so described.

Figure 1:
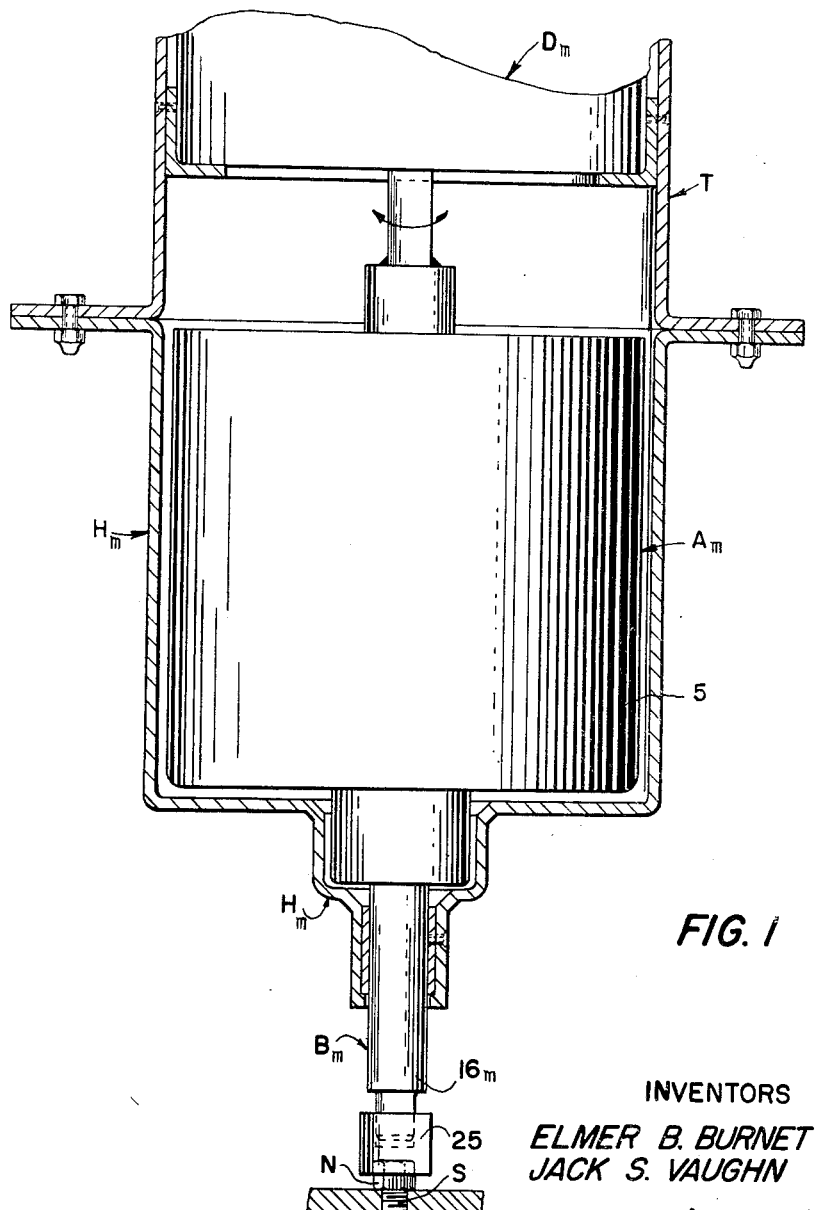
FIG. 1 is a side elevational view of the improved tool of the impulse type, shown in engagement with a threaded fastener and with a stationary casing means shown in vertical section.

With specific reference to the form of the present invention illustrated in the drawings, and referring particularly to FIG. 1, the impulse tool of the present invention is indicated generally by the reference letter T.

As shown in FIG. 1 this impulse tool T has a housing means A adapted to contain a fluid, such as oil F.

FIGS. 2–4, 4a–4b

As shown in FIGS. 2–4 an impact tool of the type disclosed in U.S. Patent No. 2,012,916 issued August 27, 1935 to R. H. Pott; U.S. Patent No. 2,049,273 issued July 28, 1936 to R. H. Pott; U.S. Patent No. 2,158,303 issued May 16, 1939 to R. H. Pott; U.S. Patent No. 2,160,150 issued May 30, 1939 to F. A. Jimerson et al.; U.S. Patent No. 2,608,118 issued August 26, 1952 to M. E. Disser; U.S. Patent No. 2,822,677 issued February 11, 1958 to H. C. Reynolds; and U.S. Reissue Patent No. 24,269 issued January 29, 1957 to M. E. Disser, has a first jaw means, such as the inner housing jaw 184, FIGS. 2, 3, 4 carried by the driven one of either the housing means $A_m$ (inner housing 180) or spindle means $B_m$ (spindle 15m) in this case by the inner housing 180. Second jaw means, such as spindle jaw 186 (FIGS. 2–4) is carried by the other or normally stationary one of either the housing means $A_m$ or spindle means $B_m$, (i.e. spindle means $B_m$).

The inner housing 180 and spindle 15m define a cavity 2m (FIGS. 2–4) and the spindle 15m (FIGS. 2–4) is provided with an annular bypass slot 182 (FIGS. 2–4). The inner housing 180 carries an inner housing jaw 184, (FIGS. 2–4) the spindle 15m carries the spindle jaw 186. Both jaws 184 and 186 are in the cavity 2m.

As the inner housing jaw 184 rotates in clockwise direction (FIG. 4) toward the stationary spindle jaw 186 and the leading edge 187 (FIG. 4) of such inner housing jaw 184 clears the end 188 (FIG. 4) of the by-pass slot 182, oil F is entrapped and compressed in the portion 189 (FIGS. 3, 4) (i.e. high pressure portion HP) of cavity 2m between the inner housing jaw 184 and spindle jaw 186 thereby impulsing and rotating the spindle jaw 186 and the spindle 15m.

When the oil pressure in portion 189 (i.e. high pressure portion HP) of the cavity 2m equals or exceeds the predetermined force of spring 190 (FIG. 2), rotation of inner housing jaw 184 ceases but inner housing shaft 191 (FIGS. 2, 4) continues to rotate (actuated by the air motor, Dm FIG. 1). The ball 192 (FIG. 2) and cam 193 (FIG. 2) forms the connection between shaft 191 and inner housing 180. Under the above mentioned pressure conditions, the ball 192 rides up the cam 193 causing the inner housing 180 to move (from the position shown in FIG. 2) axially toward the top thus causing the inner housing jaw 184 to disengage from the spindle jaw 186.

It will be understood that the compressed oil F in the high pressure portion HP of cavity 2m cushions the impact between jaws 184 and 186.

The number of impulses per revolution of the inner housing 180 depends on the number of pairs of inner housing jaws 184 and spindle jaws 186.

As shown in FIGS. 4a, 4b, the spindle means $B_m^1$ is connected by a ball $192^1$ and cam $193^1$ to a spindle shaft $16m^1$, which shaft $16m^1$ is driven by an output shaft $33m$ of a drive means, such as an air motor similar to Dm FIG. 1. A spring $190^1$ is disposed about the spindle means $B_m^1$ and contained thereabout by the casing means $H_m^1$. The housing means $A_m^1$ is connected by means of its shaft $191^1$ to the square drive 16a for a fastener socket 25 FIG. 1.

FIGS. 5–13

In this embodiment blade means, such as the blades 300, (FIGS. 5, 6, 7) are carried by the driven element (either the housing means $A_t$ or the spindle means $B_t$) in this case by the housing means $A_t$, and are engageable with cam means, such as cam 294 (FIGS. 5, 6, 7, 8), carried by the other element or normally stationary element (i.e. spindle means $B_t$). The blades 300 (when extended) entrap fluid, such as oil F between jaw means, such as spindle jaws 292 (FIGS. 5, 7, 9) carried by the other element or spindle means $B_t$ thereby impulsing such spindle jaws 292.

The housing means $A_t$, such as an inner housing, comprises a blade housing 290 (FIGS. 5, 6, 7) and front end plate 291 (FIG. 5). The spindle assembly $B_t$ (FIG. 5, 7, 9) comprises the spindle shaft 16t, spindle 15t and a cam 294 (FIGS. 5, 6, 7, 8) which is pinned at 295 (FIGS. 5, 7) to the spindle 15t. The cam 294 is provided with a cam track or groove 296 (FIGS. 5, 8). Blades 300 are contained within and are reciprocable in slots 248t (FIG. 6), in the blade housing 290 (by cam 294) adjacent cam 294 and have cam followers 297 (FIG. 5) disposed in the cam track 296 (FIGS. 5, 8).

As the inner housing $A_t$ rotates in clockwise direction (FIG. 5) the stationary cam 294 causes the blades 300 to be inserted into the cavity 2t (FIG. 7) thereby trapping oil F between the blades 300 and spindle jaws 292 (i.e. high pressure portion HP, FIG. 7), compressing such entrapped oil F and impulsing and rotating the spindle jaws 292, spindle 15t and spindle shaft 16t in clockwise direction.

Two impulses during each revolution of the inner housing $A_t$ are provided. The number of pairs of blades 300 and jaws 292 and associated peaks 298 of cam 294 determine the number of impulses/revolution of the inner housing $A_t$.

Figure 10:
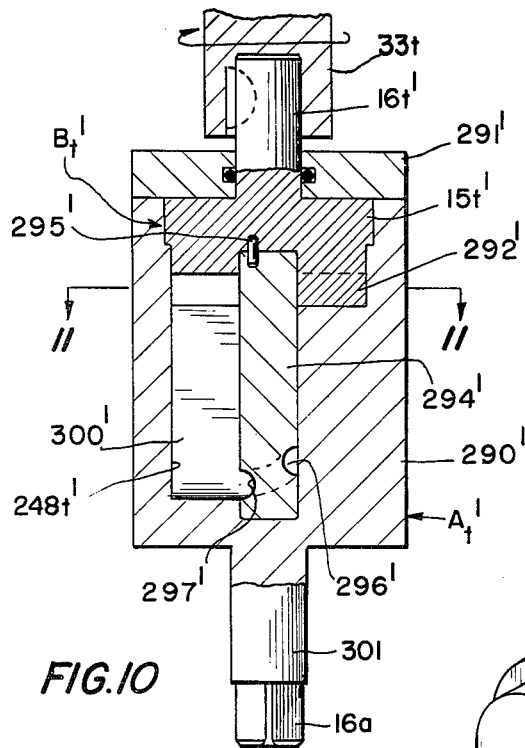
FIG. 10 is a view similar to FIG. 5 showing the spindle means connected to the output shaft of the drive means, the spindle having a single jaw and the housing means connected to the square drive for a fastener socket, the housing means having a single blade thereby producing one impulse to the housing means/revolution of the spindle means.
Figure 13:
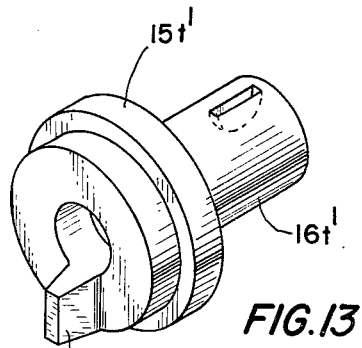
FIG. 13 is a perspective view of the spindle utilized in FIGS. 10, 11.
Figure 11:
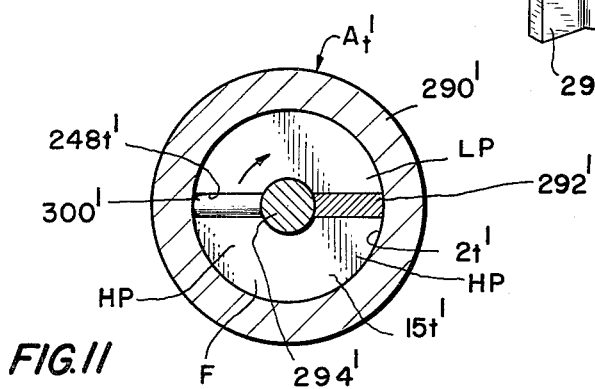
FIG. 11 is a horizontal sectional view along the line 11—11 of FIG. 10 in the direction of the arrows.
Figure 12:
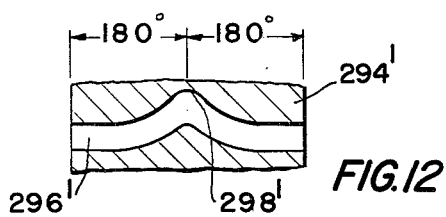
FIG. 12 is a development view of the cam employed in the tool of FIGS. 10, 11.

As shown in FIGS. 10, 11 the shaft 16t of the spindle means $B_t$ is connected to the output shaft $33_t$ of a drive means, such as an air motor Dm FIG. 1. The spindle $15t^1$ (FIG. 13) has one jaw $292^1$ which cooperates with a single blade $300^1$ in the housing means $A_t^1$ to produce one impulse to the housing means $A_t^1$ during each revolution of the spindle means $B_t^1$. The shaft 301 of the housing means $A_t^1$ is connected to the square drive 16a for a fastener socket 25 FIG. 1.

It will be recognized by those skilled in the art that the objects of the present invention have been achieved by the provision of an impulse tool which applies a force, namely oil pressure, on the spindle blade and spindle for a short time (namely during the dynamic sealing portion of the operating cycle of the impulse tool) thus providing operation in a fluid at low force levels with resultant minimum wear and attendant longer service life than conventional impact tools.

The impulse tool of the present invention is operable to control the final torque on a threaded fastener accurately and precisely within predetermined practical limits. Further, because of the simplicity of its structure, the impulse tool is easy and economical to manufacture. In addition, the impulse tool provides relatively quiet operation as compared with conventional impact tools. The impulse tool acts as a seal dynamically and as a valve statically; has all of the advantages of the stall type, clutch type and impact type tools and none of the disadvantages thereof; is lighter in weight and faster in operation than the tools of the stall type and clutch type.

The present invention also provides a cam type impulse tool capable of producing multiple impulses during each revolution of the driven element of the impulse tool.

While in accordance with the patent statutes one best known embodiment of the present invention has been illustrated and described in detail, it is to be particularly understood that the invention is not limited thereto or thereby.

We claim:

1. An impulse tool for applying a torque to an object, said impulse tool comprising:
    (a) housing means provided with a cavity for sealingly containing a fluid,
    (b) spindle means in said housing means and in said fluid,
    (c) drive means operatively associated with one of said housing means and said spindle means for causing relative rotary movement between said housing means and said spindle means,
    (d) the other of said housing means and said spindle means being adapted to engage said object,
    (e) first jaw means on one of said housing means and said spindle means and in said cavity,
    (f) second jaw means on the other of said housing means and said spindle means and in said cavity,
    (g) said first jaw means and said other and said second jaw means and said one being disposed in sealing relation during a relatively small portion of each revolution of said relative rotary movement,
    (h) said first jaw means and said other and said second jaw means and said one being operable during said relatively small portion of each revolution of said relative rotary movement to dynamically seal off a portion of said cavity so that the pressure in said high pressure portion of the fluid and on said other increases thereby causing the other of said housing means and said spindle means to rotate with respect to said one and to apply a torque to said object.

2. The impulse tool recited in claim 1 wherein said drive means is connected to said housing means.

3. The impulse tool recited in claim 1 wherein said drive means is connected to said spindle means.

4. The impulse tool recited in claim 1 wherein said first jaw means is carried by said housing means.

5. The impulse tool recited in claim 1 wherein said first jaw means is carried by said spindle means.

6. The impulse tool recited in claim 1 wherein said second jaw means is carried by said housing means.

7. The impulse tool recited in claim 1 wherein said second jaw means is carried by said spindle means.

8. An impulse tool for applying a torque to an object, said impulse tool comprising:
    (a) housing means provided with a cavity for sealingly containing a fluid,
    (b) spindle means in said housing means and in said fluid,
    (c) drive means operatively associated with one of said housing means and said spindle means for causing relative rotary movement between said housing means and said spindle means,
    (d) the other of said housing means and said spindle means being adapted to engage said object,
    (e) one of said housing means and said spindle means being provided with a recess,
    (f) blade means in said recess,
    (g) jaw means on the other of said housing means, and said spindle means,
    (h) can means on said other engageable with said blade means for inserting said blade means into said fluid,
    (i) said blade means and said other and said jaw means and said one being disposed in sealing relation during a relatively small portion of each revolution of said relative rotary movement,
    (j) said blade means and said other and said jaw means and said one being operable during said relatively small portion of each revolution of said relative rotary movement to dynamically seal off a portion of said cavity so that the pressure in said high pressure portion of the cavity and on said other increases thereby causing the other of said housing means and said spindle means to rotate with respect to said one and to apply a torque to said object.

9. The impulse tool recited in claim 8 wherein said drive means is connected to said housing means.

10. The impulse tool recited in claim 8 wherein said drive means is connected to said spindle means.

11. The impulse tool recited in claim 8 wherein said housing means is provided with said recess.

12. The impulse tool recited in claim 8 wherein said spindle means is provided with said recess.

13. The impulse tool recited in claim 8 wherein said jaw means is carried by said housing means.

14. The impulse tool recited in claim 8 wherein said jaw means is carried by said spindle means.

References Cited by the Examiner

UNITED STATES PATENTS

| | | | |
|---|---|---|---|
| 1,422,929 | 7/22 | Cooke | 64—26 |
| 1,685,839 | 10/28 | Du Bois | 64—26 |
| 2,307,187 | 1/43 | Anderson | 64—26 |
| 2,422,545 | 6/47 | Hanson | 64—26 |
| 2,564,212 | 8/51 | Ramsey | 192—58 |
| 3,116,617 | 1/64 | Skoog | 64—26 |

BROUGHTON G. DURHAM, *Primary Examiner.*

FRANK SUSKO, *Examiner.*